GEORGE ULICS
GEORGE H. MULLER
DELMAR C. GRIMES
INVENTORS

BY John R. Faulkner
Roger E. Erickson
ATTORNEYS

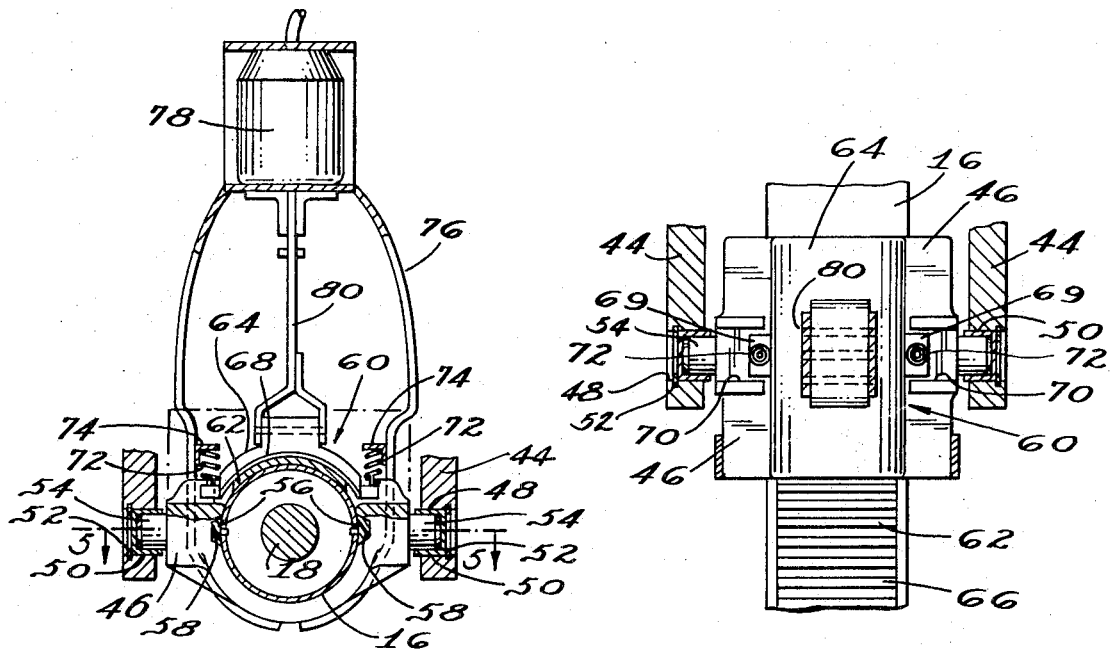
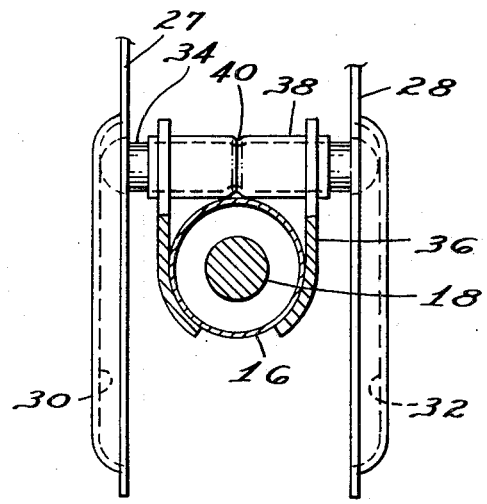
GEORGE ULICS
GEORGE H. MULLER
DELMAR C. GRIMES
INVENTORS
BY John R. Faulkner
Roger E. Erickson
ATTORNEYS United States Patent Office 3,548,675
Patented Dec. 22, 1970

3,548,675
ADJUSTABLE STEERING MECHANISM
Delmar C. Grimes, Flint, George H. Muller, Ann Arbor, and George Ulics, Plymouth, Mich., assignors to Ford Motor Company, Dearborn, Mich., a corporation of Delaware
Filed Dec. 16, 1968, Ser. No. 784,051
Int. Cl. B62d 1/18
U.S. Cl. 74—493                          17 Claims

ABSTRACT OF THE DISCLOSURE

An adjustable steering mechanism for an automotive vehicle in which the steering column is slidably and pivotally connected to each of two axially spaced apart support members and in which the steering column is not constrained to pivot about a single fixed point.

BACKGROUND OF THE INVENTION

As the silhouettes of automotive vehicles become increasingly lower, the angle that the steering column makes with the horizontal also becomes smaller. As a result, the clearances between the lowermost part of the steering wheel and the driver seat and between the steering column outer housing and the driver's knees have also lessened. Consequently, it becomes desirable to provide an adustable steering column which provides a number of driving positions to suit a broad range of drivers with varying physical dimensions, as well as to provide a remote steering column position that facilitates ease of entry into and exit from the driver seat.

The present invention provides a steering column mechanism which is both axially and angularly adjustable to accommodate a variety of driving positions and a remote entry and exit position. Furthermore, the axial adjustability is accomplished without the necessity of telescoping steering column components.

The invention provides a steering column mechanism in which the entire length of the steering column is angularly and axially movable to provide greater knee clearance for the driver upon entry or exit.

The invention also provides a control panel means mounted to the steering column and movable therewith to provide controls accessible to even the smallest vehicle operator.

The invention provides a unitized construction in which the steering column assembly and its supports may be economically and easily installed into the vehicle.

BRIEF SUMMARY OF THE INVENTION

An adjustable steering mechanism constructed in accordance with this invention includes a steering column asembly attached to the vehicle body by a pair of support means. One of the support means slidably and pivotally supports the steering column assembly at its lower end and the other of the support means slidably and pivotally supports the assembly at a generally intermediate portion.

BRIEF DESCRIPTION OF THE DRAWINGS

FIG. 3 is a cross sectional view along line 3—3 of FIG. 1;

FIG. 4 is a cross sectional view along line 4—4 of FIG. 1;

FIG. 5 is a cross sectional view along line 5—5 of FIG. 3.

DETAILED DESCRIPTION OF THE PREFERRED EMBODIMENT

Figure 1:
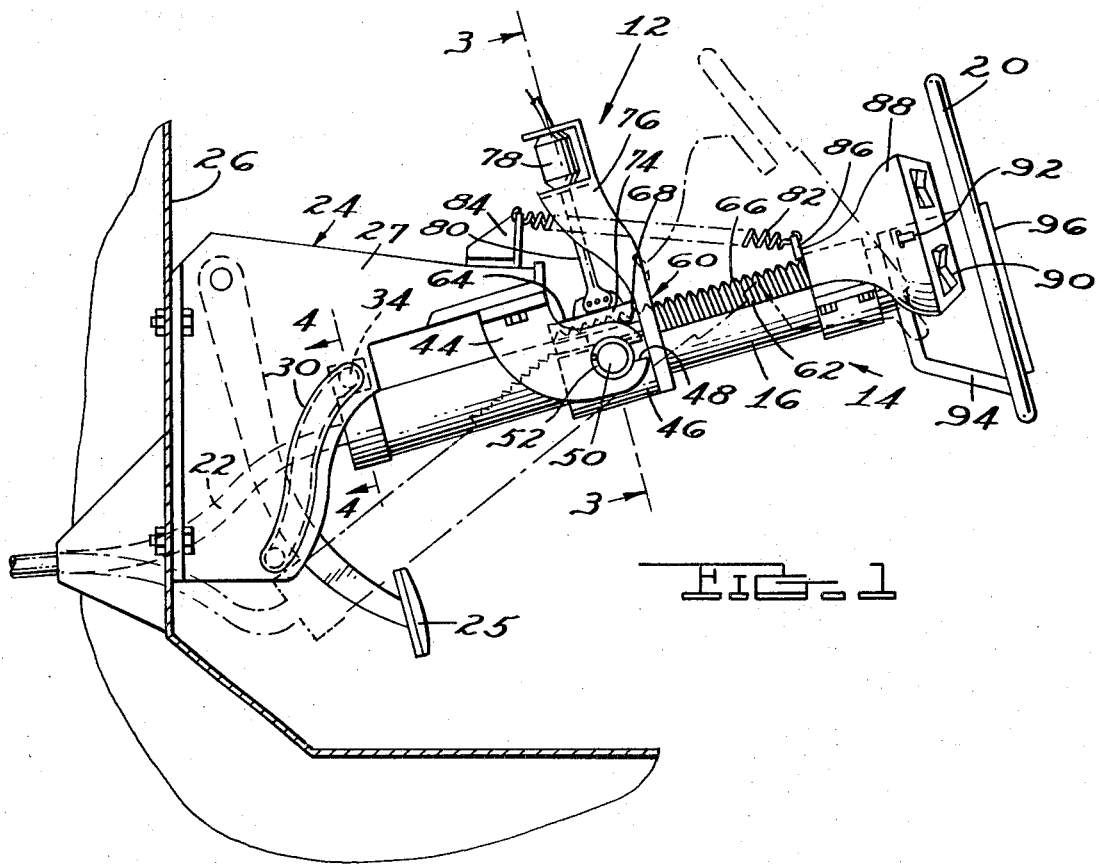
FIG. 1 is a side elevational view of an adjustable steering column mechanism according to the present invention in which the solid line shows the mechanism in one of its several operable driving positions and in which the broken line shows the mechanism in its swing-away position.
Figure 2:
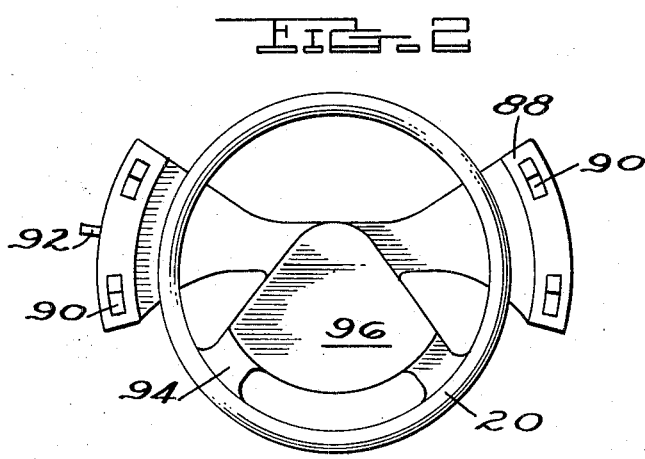
FIG. 2 is a front elevational view of the steering wheel and the control panel.

The drawings illustrate an adjustable steering column unit 12 constructed in accordance with this invention. The unit 12 includes a movable steering column assembly 14 comprising a housing 16 which encloses and rotatably supports a steering shaft 18. A steering wheel 20 is secured to the upper end of the steering shaft 18 and rotates relative to the housing 16. A flexible torque transmission means 22 is connected to the steering shaft 18 at its lower end and connects the steering shaft and a steering gear (not shown). The flexible torque transmitting means 22 may be a flexible shaft as shown in FIG. 1 or it may be a pair of universal joints separated by a slip connection.

The steering column assembly 14 is attached to the vehicle body by a support member 24 bolted to the body firewall 26. The support member 24 has an inverted U-shaped cross section which receives the lower portion of the steering column assembly 14 and support brake pedal 25. Support member 24 includes a pair of parallel wall sections 27 and 28. Formed in these wall sections is a pair of ogee shaped grooves 30 and 32 that open toward each other and provide a contoured track which receives the rounded ends of a shaft or pin 34. Alternatively, a pair of slots formed in the support member 24 could be used with a modified pin structure in place of the grooves 30 and 32. A bracket 36 connects the pin 34 to the steering column housing. Bracket 36 includes a cylindrical portion 38 having an annular constriction 40 which engages a corresponding annular groove formed in the pin 34 and secures pin 34 within the portion 38. The bracket 36 holds pin 34 so that its axis is substantially perpendicular to the axis of the steering column. It may be observed that the lower portion of the steering column assembly 14 is movable relative to support member 24 to the extent permitted by the sliding or rotating of pin 34 in grooves 30 and 32.

Attached to the upper part of support member 24 is a two arm bracket 44 which pivotally supports a yoke 46. The bracket 44 has a pair of slots 48 formed in is arms which receive a pair of end caps 50 and snap rings 52. The yoke 46 is provided with a pair of journalled trunions 54 which are rotatably received within the end caps 50. The intermediate portion of the steering column assembly 14 is slidably cradled within the yoke 46. The portion of yoke 46 in contact with the steering column housing 16 may be lined with a suitable non-friction material such as nylon (not shown).

A pair of diametrically opposed guide strips 56 extend axially along the column housing 16 and are slidably received in a corresponding pair of grooves 58 formed in the yoke 46. Strips 56 and grooves 58 prevent axial rotation of housing 16 relative to yoke 46. The length of the guide strips 56 must be sufficient so that a portion of each strip 56 engages one of grooves 58 during all positions of adjustment of the steering column assembly 14.

A locking mechanism 60 which fixes the axial position of the steering column assembly 14 relative to the yoke 46 includes a lower locking member 62 attached to the steering column housing 16 and an upper locking member 64 axially fixed relative to yoke 46. The lower locking member 62 comprises a rack 66 of upwardly protruding buttress type teeth. Rack 66 has the shape of a cylindrical arc with the grooves of the teeth extending perpendicular to the axis of the steering column assembly 14. The upper locking member 64 has rack 68 of downwardly extending teeth corresponding to and engageable with the teeth of rack 66. Upper member 64 has two oppositely directed fingers 69 received within guide slots 70 of yoke 46 which prevent axial movement of upper member 64 relative to yoke 46, but permit member 64 to move radially outwardly from yoke 46 causing teeth 68 and 66 to disengage. The upper locking member 64 is resiliently urged into engagement with the lower member 62 by a pair of compression springs 72 extending from brackets 74 to the fingers 69 of the upper locking member 64. The spring support brackets 74 are secured to a bracket 76 which, in turn, is attached to yoke 46.

A vacuum motor 78 is mounted on the upper portion of bracket 76 and has a movable arm 80 attached to upper locking mechanism 64. The vacuum motor 78 may be installed so as to be actuatable by a control switch mounted near the driver or by a door switch operable by the opening of the door of the vehicle. A mechanical means (not shown) may also be provided to separate the locking members 62 and 64 and may be used either in place of or as an alternative to the vacuum release means.

A pair of tension springs 82 interconnect a bracket 84 mounted on support member 24 and a pair of eyes 86 secured to the upper end of the steering column housing 16. Upon release of the locking mechanism 60, the forces of springs 82 bias the steering column assembly 14 into the swing-away position for ease of entry or exit.

A control panel 88 is mounted to the upper end of the steering column housing 16 adjacent the steering wheel 20. Control panel 88 is radially larger than the steering wheel to provide a surface outside the periphery of the steering wheel for a plurality of rocking switches 90. Control panel 88 is spaced apart axially from the steering wheel 20 sufficiently to provide adequate clearance for the vehicle operator's hands. Rocking switches 90 may be provided for controlling such things as vehicle headlights, windshield wipers and washers, dome lights and as well as the vacuum motor 76. It may be seen that the control panel, being mounted to the upper end of the steering column housing, moves with the housing and stays axially fixed relative to the steering wheel. Thus, when the steering wheel is adjusted to a position comfortable to the driver, the control switches will be accessible regardless of the length of the driver's arms. A lever switch 92 may also be provided extending from the side of the control panel to operate the vehicle turn indicator.

The steering wheel 20 is of a deep dish design and has two spokes 94. A pad 96 is located within the periphery of the steering wheel over the end of the steering shaft.

It may also be noted that this invention can be used with a steering column having a collapsible or deformable portion between the upper end of the steering column housing and the steering wheel. Such a collapsible mechanism is not shown but is known in the art.

OPERATION

The foregoing description describes an adjustable steering column unit 12 which is generally movable in the fore and aft direction. When the upper locking member 64 of mechanism 60 engages the lower locking member 62, the position of the column assembly 14 is fixed relative to its support members 24 and 44. When the upper locking member 64 is released from engagement with the lower locking member 62, the column is slidable relative to its support members. The springs 82, upon release of the locking mechanism 60, urge the steering column assembly 14 into the swing-away position as shown by the broken lines of FIG. 1. In that position the lower end of the assembly 14 is at the bottom of the ogee-grooves 30 and 32 of support member 24 and the axial distance between yoke 46 and the steering wheel 10 is at a minimum. Consequently, clearance between the driver and the steering column assembly 14 is at a maximum for ease of entry or exit.

The vehicle support operator may adjust the steering wheel to a driving position when the locking mechanism 60 is released by pulling back on the steering wheel 20 and overcoming the force of the springs 82. When the desired position of the steering wheel is reached, the locking members 62 and 64 of mechanism 60 are once again engaged and the selected steering wheel position becomes fixed. The locking members 62 and 64 are continually urged toward engagement by compression springs 72 but are separated by the force of a vacuum motor 78 engaged by a suitable vacuum control switch accessible to the driver (not shown).

This description presents the presently preferred embodiment of the invention. Modifications and alterations will occur to those skilled in the art that are inluded with the scope and spirit of the invention.

We claim:

1. An adjustable steering mechanism for an automotive vehicle including a body portion comprising:
   a steering column including a steering shaft and an outer housing positioned about said steering shaft,
   a steering wheel mounted on the upper end of said steering shaft,
   first and second support means attached to the vehicle body,
   the lower end of said steering column being slidably and pivotally connected to said first support means,
   an intermediate portion of said steering column being slidably and pivotally connected to said second support means.

2. An adjustable steering mechanism according to claim 1 and including:
   locking means to selectively lock said steering column from sliding movement relative to one of said support means.

3. An adjustable steering mechanism according to claim 1 and including:
   the lower end of said steering column being connected to said first support means by means of a pin and groove or pin and slot combination.

4. An adjustable steering mechanism according to claim 1 and including:
   a slot or groove formed within said first support means,
   a finger member extending from said lower end of said steering column and slidably received within said slot or groove.

5. An adjustable steering mechanism according to claim 1 and including:
   said first support means having a pair of substantially parallel surfaces receiving the lower end of said steering column,
   a pair of grooves formed in said first support means,
   a pin attached to said steering column, one end of said pin being slidably received in one of said grooves, the other end of said pin being slidably received in the other of said grooves,
   whereby said pin is slidable within said grooves to adjust the position of the steering column.

6. An adjustable steering mechanism according to claim 5 and including:
   each of said grooves having an ogree-shaped contour.

7. An adjustable steering mechanism according to claim 5 and including:
   said second support means comprising a bracket having a generally U-shaped cross section,
   a collar pivotally connected to said bracket and positioned about an intermediate portion of said steering column,
   a first locking member having a plurality of teeth and being attached to said steering column,
   a second locking member having a plurality of teeth corresponding to those of said first locking member and being attached to a portion of said collar,
   said first locking member being engageable with said second locking member.

8. An adjustable steering mechanism according to claim 7 and including:
   a control panel mounted on said steering column intermediate said steering wheel and said second support member,
a plurality of switch means located on said panel at a distance from the axis of the steering column greater than the major radius of the steering wheel,
whereby the spacing of said steering wheel and said control panel remains constant for all positions of steering column adjustment.

9. An adjustable steering mechanism according to claim 1 and including:
said support means permitting movement of said steering column in only a vertical plane.

10. An adjustable steering mechanism according to claim 1 and including:
said second support means comprising a bracket having a generally U-shaped cross section,
a collar pivotally connected to said bracket and positioned about an intermediate portion of said steering column,
a first locking member having a plurality of teeth and being attached to said steering column,
a second locking member having a plurality of teeth corresponding to those of said first locking member and being attached to a portion of said collar,
said first locking member being engageable with said second member.

11. An adjustable steering mechanism according to claim 1 and including:
a control panel mounted on said steering column intermediate said steering wheel and said second support member.

12. An adjustable steering mechanism according to claim 1 and including:
a control panel mounted on said steering column intermediate said steering wheel and said second support member,
a plurality of switch means located on said panel at a distance from the axis of the steering column greater than the major radius of the steering wheel,
whereby the spacing of said steering wheel and said control panel remains constant for all positions of steering column adjustment.

13. An adjustable steering mechanism for an automotive vehicle including a body portion comprising:
a steering column including a steering shaft,
a steering wheel mounted on the upper end of said steering shaft,
first and second support means attached to the vehicle body,
the lower end of said steering column being connected to said first support means,
an intermediate portion of said steering column being slidably and pivotally connected to said second support means,
locking means to selectively lock said steering column from sliding movement relative to said second support means,
said locking means comprising a first toothed member attached to said steering column,
a second toothed member attached to said second support means and engageable with said first toothed member,
means to separate said first toothed member from said second toothed member to permit said steering column to move axially relative to said second support member.

14. An adjustable steering mechanism according to claim 13 and including:
said first and second toothed members having teeth extending perpendicular to axis of said steering column.

15. An adjustable steering mechanism according to claim 1 and including:
a flexible, torque transmitting shaft connected to the lower end of said steering shaft.

16. An adjustable steering mechanism for an automotive vehicle including a body portion and comprising:
a steering shaft,
a steering column rotatably supporting said steering shaft,
said steering shaft and said steering column having axes being within a substantially longitudinal extending plane of said vehicle,
a steering wheel mounted on the upper end of said steering shaft,
support means affixed to said vehicle body,
means connecting said steering column to said support means and constructed to support said column for both axial and angular displacement substantially within said longitudinal extending plane relative to said body portion,
locking means constructed to selectively secure said steering column in any one of a plurality of axially and angularly displaced positions.

17. An adjustable steering mechanism for an automotive vehicle including a body portion comprising:
a steering shaft,
a steering column rotatably supporting said steering shaft,
said steering shaft and said steering column having axes being within a substantially longitudinally extending plane of said vehicle,
a steering wheel mounted on the upper end of said steering shaft,
support means affixed to said vehicle body,
first connecting means connecting a first portion of said steering column to said support means and constructed to support said column for both axial and angular displacement relative to said body portion,
second connecting means connecting a second portion of said steering column to said support means and constructed to define a path for the angular and axial displacement of said column substantially within said longitudinal extending plane,
locking means to selectively secure said steering column in any one of a plurality of axially and angularly displaced positions.

References Cited
UNITED STATES PATENTS 3,216,521  11/1965  Ulrich _____ 74—493X

FOREIGN PATENTS 17,057  1903  Great Britain _____ 74—473

MILTON KAUFMAN, Primary Examiner